UNITED STATES PATENT OFFICE 2,342,465

PROCESS FOR PREPARING HYDROBROMIC ACID

Frieda Goldschmidt and Friedrich Deutsch, Rehoboth, Palestine

No Drawing. Application August 9, 1941, Serial No. 406,170. In Palestine August 10, 1940

7 Claims. (Cl. 23—154)

This invention relates to the preparation of hydrobromic acid from bromine.

It has already been proposed to prepare hydrobromic acid from bromine by reduction by means of sulfur in the presence of water according to the equation:

$$4H_2O + 3Br_2 + S = H_2SO_4 + 6HBr$$

This reaction is rather slow, and a satisfactory progress thereof can be attained only by vigorously shaking the mixture until completion of the reaction. By so proceeding, the mixture remains cold during about the first third of the total time required for the reaction while thereafter, it heats suddenly and spontaneously up to 100° C. and even higher. This causes considerable evaporation of elementary bromine not yet consumed by the reaction, and consequently, a dangerous pressure develops in the reaction vessel and losses of bromine are bound to occur through unavoidable leakages.

It has now been found that the reduction of bromine by sulfur in the presence of water can be considerably facilitated and rendered more suitable for technical performance by carrying it out as a two-stage process wherein in the first stage, sulfur bromide is formed by dissolving sulfur in elementary bromine according to the equation (1) $$2S + Br_2 = S_2Br_2$$

while in the second stage, sulfur bromide, elementary bromine and water are caused to react according to the equation (2) $$S_2Br_2 + 5Br_2 + 8H_2O = 2H_2SO_4 + 12HBr$$

with the formation of an aqueous solution of hydrobromic acid and sulfuric acid.

In the first stage, the sulfur may be dissolved in more bromine than is required for the formation of sulfur bromide, and even in the full amount of bromine required for the total process, and a solution of sulfur bromide in bromine is then the result of the first stage.

The second stage can be executed:

1. By mixing sulfur bromide, bromine and water, or by gradually adding sulfur bromide to a mixture of bromine and water; or 2. By preparing a solution of sulfur bromide in elementary bromine and mixing it with water, or by gradually adding a solution of sulfur bromide in elementary bromine to water.

Water should be present in the second stage in a considerable excess over the amount required by Equation 2. It would not be advisable to use less than about 36 mols. of water for each mol. of sulfur bromide as otherwise the reaction would be very slow. By using 71.4 mols. of water for each mol. of sulfur bromide, an aqueous solution of 42.1 per cent. of hydrobromic acid and of 8.5 per cent. of sulfuric acid results from the second stage of the process, and if this is subjected to distillation in order to separate the hydrobromic acid, an aqueous hydrobromic acid of about 46 per cent. strength and constant boiling point distils at once. With less water present in the reaction mixture, a more concentrated hydrobromic acid distils first until the concentration drops to about 46 per cent; and conversely with more water, the concentration of the distilling hydrobromic acid is first below 46 per cent. but tends to rise to this value.

It has been found, furthermore, that the reaction of the second stage is considerably facilitated by the presence of hydrobromic acid in the reaction mixture, for it lets the reaction begin immediately and considerably shortens it. Besides, the partial pressure of bromine in the reaction vessel and its tendency to evaporate are markedly smaller than with the known process referred to above, apparently due to the fact that as long as elementary bromine is present, it dissolves in the hydrobromic acid. Moreover, the reaction temperature remains far below those observed with the known process, in fact below about 60° C. This allows of the use of reaction vessels made even of such materials as would not stand sudden heating or high pressure, such as moulded glass.

Therefore, pre-formed hydrobromic acid may advantageously be caused to be present in the second stage from the outset. It is particularly convenient for this purpose to use all or part of the reaction mixture resulting from the second stage of a previous cycle of operations instead of or in addition to water in the second stage of the subsequent cycle.

Preferably the reaction mixture of the second stage is cooled in order to avoid an undesired rise of temperature, and this either during the whole reaction or, when adding sulfur bromide only in portions, before the addition of every portion.

From the reaction mixture of the second stage, hydrobromic acid can be recovered by distillation as mentioned above. Alternatively, the sulfuric acid may be removed from the mixture by precipitation, for example as barium sulfate, the calculated amount of barium being introduced into the mixture, preferably in the form of its carbonate.

Example 1

32.07 parts by weight of sulfur are dissolved in 479.5 parts of bromine, and one third of this solution is poured into 642 parts of water contained in a vessel which can be hermetically sealed and is bromine-proof. The mixture is thoroughly shaken or stirred until the reaction is completed which is indicated by the disappearance of the oily drops first formed. During this reaction, the temperature of the mixture rises to about 50–60 C. To the mixture, after cooling, a second third of the sulfur bromide-bromine solution is added with shaking or stirring until disappearance of the oily drops (which takes about half the time required for the first third in view of the amount of hydrobromic acid already present). Finally, the last third of the sulfur bromide-bromine solution is added under the same conditions as before.

In this manner, 1154 parts of a solution containing 42.1% hydrobromic acid and 8.5% of sulfuric acid are obtained.

Example 2

16.04 parts by weight of sulfur are dissolved in 239.8 parts of bromine and the solution is poured into 1154 parts of the reaction mixture obtained as a result of the second stage of the reaction described in Example 1, to which 321 parts of water are further added. The mixture is shaken or stirred until the oily drops have disappeared, and forms then again an aqueous solution containing 42.1% of HBr and 8.5% of $H_2SO_4$.

Any suitable quantity of this mixture can be used as reaction medium, or addition to the reaction medium, of subsequent cycles of operations while the rest is worked up by recovering therefrom hydrobromic acid.

Example 3

32.07 parts by weight of sulfur are dissolved in 479.5 parts of bromine and this solution is added gradually through a dropping funnel into a vessel containing 642 parts of water. The mixture is shaken or stirred during the addition of the solution until the oily drops have disappeared, and forms again an aqueous solution containing 42.1% of hydrobromic acid and 8.5% of sulfuric acid.

Example 4

32.07 parts by weight of sulfur are dissolved in 479.5 parts of bromine and this solution is added gradually through a dropping funnel into a vessel containing 642 parts of water and 577 parts of a solution obtained according to Example 3. The mixture is shaken or stirred as in Example 3. An aqueous solution containing 42.1% of hydrobromic acid and 8.5% of sulfuric acid is formed.

We claim:

1. The process for preparing hydrobromic acid which comprises dissolving sulfur in at least so much bromine as corresponds to the formation of sulfur monobromide ($S_2Br_2$) and mixing the sulfur monobromide formed with water in the presence of unreacted bromine.

2. The process for preparing hydrobromic acid which comprises dissolving sulfur in bromine in a proportion of at least one atomic amount of bromine for each atomic amount of sulfur, and mixing such solution with water in the presence of so much bromine as to bring the total amount of bromine used up to substantially six atomic amounts of bromine for each atomic amount of sulfur used.

3. The process for preparing hydrobromic acid which comprises dissolving sulfur in bromine in a proportion of at least one atomic amount of bromine for each atomic amount of sulfur, and mixing such solution with about 36 molecular amounts of water for each atomic amount of sulfur in the presence of so much bromine as to bring the total amount of bromine used up to substantially six atomic amounts of bromine for each atomic amount of sulfur used.

4. The process for preparing hydrobromic acid which comprises dissolving sulfur in bromine in a proportion of more than one atomic amount of bromine for each atomic amount of sulfur, and mixing such solution with water in the presence of so much bromine as to bring the total amount of bromine used up to substantially six atomic amounts of bromine for each atomic amount of sulfur used.

5. The process for preparing hydrobromic acid which comprises dissolving sulfur in bromine in a proportion of substantially six atomic of sulphur, and mixing such solution with about 36 molecular amounts of water for each six atomic amounts of bromine.

6. The process for preparing hydrobromic acid which comprises dissolving sulfur in bromine in a proportion of substantially six atomic amounts of bromine for each atomic amount of sulfur, and gradually mixing such solution with about 36 molecular amounts of water for each six atomic amounts of bromine.

7. The process for preparing hydrobromic acid which comprises dissolving sulfur in bromine in a proportion of substantially six atomic amounts of bromine for each atomic amount of sulfur; mixing such solution with about 36 molecular amounts of water; and admixing at least part of the reaction liquor thereby obtained with further amounts of water and sulfur bromine solution in the proportions aforesaid.

FRIEDA GOLDSCHMIDT.
FRIEDRICH DEUTSCH.